US010677592B2

(12) United States Patent
Lukic

(10) Patent No.: US 10,677,592 B2
(45) Date of Patent: Jun. 9, 2020

(54) METHOD FOR ORIENTING A DEVICE AXIS IN A DEFINED STATE

(71) Applicant: Hilti Aktiengesellschaft, Schaan (LI)

(72) Inventor: Sasha Lukic, Buchs (CH)

(73) Assignee: Hilti Aktiengesellschaft, Schaan (LI)

(*) Notice: Subject to any disclaimer, the term of this patent is extended or adjusted under 35 U.S.C. 154(b) by 197 days.

(21) Appl. No.: 15/778,564

(22) PCT Filed: Nov. 23, 2016

(86) PCT No.: PCT/EP2016/078487
§ 371 (c)(1),
(2) Date: May 23, 2018

(87) PCT Pub. No.: WO2017/093087
PCT Pub. Date: Jun. 8, 2017

(65) Prior Publication Data
US 2018/0356220 A1 Dec. 13, 2018

(30) Foreign Application Priority Data
Nov. 30, 2015 (EP) ..................................... 15197020

(51) Int. Cl.
*G01C 9/26* (2006.01)
*G01C 15/00* (2006.01)
*G01C 9/06* (2006.01)
*G01C 9/00* (2006.01)

(52) U.S. Cl.
CPC .................. *G01C 9/26* (2013.01); *G01C 9/06* (2013.01); *G01C 15/004* (2013.01); *G01C 9/00* (2013.01); *G01C 2009/066* (2013.01)

(58) Field of Classification Search
CPC ..................................... G01C 9/06; G01C 9/26
USPC ........................................... 33/290, 291, 301
See application file for complete search history.

(56) References Cited

U.S. PATENT DOCUMENTS

| 5,291,262 A | 3/1994 | Dunne |
| 5,689,330 A | 11/1997 | Gerard et al. |
| 6,621,560 B2 * | 9/2003 | Greco .................. G01B 21/045 33/366.11 |

(Continued)

FOREIGN PATENT DOCUMENTS

| DE | 10 2013 217 479 A1 | 3/2015 |
| EP | 0 130 738 A2 | 1/1985 |

OTHER PUBLICATIONS

PCT/EP2016/078487, International Search Report dated Feb. 14, 2017, with partial English translation (Five (5) pages).

(Continued)

Primary Examiner — George B Bennett
(74) Attorney, Agent, or Firm — Crowell & Moring LLP

(57) ABSTRACT

A method for orienting a device axis of equipment in a defined state by a leveling unit includes storing, in a control device, a characteristic curve of zero positions of a tilt sensor of the leveling unit according to an operating temperature of the equipment, measuring the operating temperature, determining the zero position of the tilt sensor associated with the measured temperature with the aid of the characteristic curve, and using the leveling unit to orient the device axis in the defined state which has been established by the zero position determined with the aid of the characteristic curve.

12 Claims, 4 Drawing Sheets

(56) References Cited

U.S. PATENT DOCUMENTS

| | | | | |
|---|---|---|---|---|
| 6,628,373 B2* | 9/2003 | Kahle | ............... | G01C 15/002 |
| | | | | 33/366.11 |
| 2014/0283399 A1* | 9/2014 | Fessler | ............... | G01C 15/004 |
| | | | | 33/291 |
| 2015/0354942 A1* | 12/2015 | Bridges | ............... | G01B 11/005 |
| | | | | 33/503 |
| 2015/0362345 A1* | 12/2015 | Lukic | ............... | G01C 15/04 |
| | | | | 250/239 |
| 2016/0377428 A1* | 12/2016 | Schubert | ............... | G01C 9/10 |
| | | | | 33/366.11 |
| 2019/0154501 A1* | 5/2019 | Lukic | ............... | G01C 15/004 |

OTHER PUBLICATIONS

U.S. Patent Application, "Method for Measuring an Operating Temperature of Equipment", filed May 23, 2018, Inventor: Sasha Lukic.

U.S. Patent Application, "Method for Checking and/or Calibrating a Horizontal Axis of a Rotating Laser", filed May 23, 2018, Inventor: Sasha Lukic et al.

U.S. Patent Application, "Method for Measuring a Measurement Distance Between a Rotating Laser and a Laser Receiver", filed May 23, 2018, Inventor: Andreas Winter et al.

U.S. Patent Application, "Method for Checking a Rotary Laser Level for Cone Errors", filed May 23, 2018, Inventor: Sasha Lukic.

U.S. Patent Application, "Method for Checking and/or Calibrating a Vertical Axis of a Rotating Laser", filed May 23, 2018, Inventor: Sasha Lukic et al.

* cited by examiner

METHOD FOR ORIENTING A DEVICE AXIS IN A DEFINED STATE

CROSS REFERENCE TO RELATED APPLICATIONS

This application claims the priority of International Application No. PCT/EP2016/078487, filed Nov. 23, 2016 and European Patent Document No. 15197020.9, filed Nov. 30, 2015, the disclosures of which are expressly incorporated by reference herein.

BACKGROUND AND SUMMARY OF THE INVENTION

The present invention relates to a method and apparatus for orienting a device axis in a defined state.

The accuracy of equipment, such as rotating lasers, is affected by ambient conditions, such as the storage temperature or operating temperature of the apparatus, by an external force on the apparatus in the event of falls or heavy impact, and by aging processes of the apparatus components of the apparatus. The aging of the device components takes place on a long time scale and changes the accuracy of an apparatus very slowly. The external impact on an apparatus by a fall or a strong impact is an event that is unpredictable to the operator and therefore difficult to take into account. By contrast, the operating temperature of an apparatus is a quantity that always affects the accuracy of the apparatus. Every use or operation of the apparatus is subject to environmental conditions which influence the accuracy of the apparatus.

Rotating lasers can be arranged in different device layers, which are arranged as horizontal position and vertical position. In this case, a distinction is made between horizontally usable rotating lasers, which are used exclusively in the horizontal position, and horizontally and vertically usable rotating lasers, which are used in horizontal position and vertical position. Horizontally usable rotating lasers have as device axes on a first horizontal axis and a second horizontal axis, which are perpendicular to each other and span a horizontal plane. Horizontally and vertically usable rotating lasers have as a device axis in addition to the first and second horizontal axis on a vertical axis which is perpendicular to the horizontal plane of the first and second horizontal axis.

In their operating instructions, for the operating temperature of the rotating laser the device manufacturers of rotating lasers define a temperature range in which the rotating laser may be operated. The operation of rotating lasers is typically allowed in a temperature range of −20° C. to +50° C. The adjustment of a rotating laser and the calibration of the device axes are carried out by the device manufacturer under fixed environmental conditions; the calibration of the device axes is typically carried out at a normal temperature of +20° C. In order to ensure the accuracy of a rotating laser during operation, the accuracy must be regularly checked by the operator and a calibration of the rotating laser must be carried out if a maximum difference, which has been defined by the device manufacturer, is exceeded. The accuracy of the rotating laser for each device axis is checked separately.

Methods are known for checking and/or calibrating a horizontal axis, which are used in all horizontally applicable rotating lasers, and for checking and/or calibrating a vertical axis, which are used exclusively in vertically usable rotating lasers. In a first method, the first horizontal axis is checked and in a second method the second horizontal axis is checked, wherein the order in which the first and second methods are performed is arbitrary. In the case of horizontally and vertically usable rotating lasers, following the check of the first and second horizontal axes, the vertical axis is checked in a third method.

The orientation of the device axes in a defined state is done by means of a leveling device, which is arranged in a device housing of the rotating laser. The defined state of the device axes may be a horizontal state or a vertical state. The leveling device comprises a first leveling unit, which orients the first horizontal axis in a first defined state, a second leveling unit, which orients the second horizontal axis in a second defined state, and in a vertically insertable rotating laser, a third leveling unit, which orients the vertical axis in a third defined state. The leveling units each comprise a tilt sensor which measures the tilt of the device axis, and an adjusting element with which the tilt of the device axis is adjustable. Ideally, the tilt sensors are oriented parallel to the assigned device axes. If a tilt sensor is not oriented parallel to the assigned axis of the device, the axis of the device has a tilt error.

For horizontal or vertical orientation of equipment such as rotating lasers, spirit levels are usually used as tilt sensors. A tilt sensor formed as a spirit level comprises a housing filled with a liquid and a gas bubble, a light source, and one or more photodetectors. The housing is closed by a convexly curved cover layer and the gas bubble moves along the cover layer when the tilt sensor is tilted with respect to a horizontal or vertical reference plane. The light source preferably emits divergent light (e.g., LED) and is centered with an optical axis of the tilt sensor, which simultaneously forms the axis of symmetry of the spirit level. The gas bubble in the sealed liquid indicates the orientation of the bubble. The gas bubble is always at the highest point of the liquid. The spirit level is connected to the apparatus so that the gas bubble is in the defined state of the apparatus at a certain point of the spirit level. The defined state of the apparatus can be made or restored with the help of the spirit level with little effort. The defined state does not necessarily have to be a horizontally or vertically oriented state of the apparatus. In principle, any desired tilted arrangement for the defined state can also be predetermined by a tilted arrangement of the bubble level on the apparatus.

Known rotating lasers, such as the Laser Beacon LB-400 rotating laser, have a temperature sensor that measures the temperature inside the device housing of the rotating laser. If the measured temperature exceeds the upper limit of the permissible temperature range during operation, the operation of the rotating laser is interrupted by switching off the motors and the beam source. Once the measured temperature falls below the upper limit, the operation of the rotating laser can be continued. The temperature sensor ensures that the motors and the beam source are operated only within the allowable temperature range and protects these device components from damage due to increased temperatures. The temperature of the rotating laser is not taken into account when calibrating the device axes of the rotating laser.

From DE 10 2013 217 479 A1 a rotating laser is known in which the influence of the temperature, the influence of accelerations or forces acting on the rotating laser and the aging of the device components of the rotating laser are taken into account. The rotating laser comprises a monitoring unit and a sensor unit with a temperature sensor, an acceleration sensor and a real-time sensor. The temperature sensor measures a storage or operating temperature of the rotating laser, the acceleration sensor measures occurring forces and accelerations from falls or high impact, and the real-time sensor measures the time since the last proper calibration of the rotating laser. The measured values of the sensors are recorded at regular intervals with the aid of the monitoring unit and forwarded to a control and evaluation device. Limit values are defined for each measurand and the measured values of the sensors are compared with the limit values. If a measurand is outside the limit value, a warning is generated for the operator with the aid of the monitoring unit. The warning message is visually or acoustically displayed and includes a prompt for the operator to calibrate the rotating laser. For the measurand "temperature," a limit interval is defined with a lower limit and an upper limit, the lower limit being the minimum temperature and the upper limit being the maximum temperature of the allowable temperature range. For the measurands "acceleration" and "time duration," upper limit values are defined.

The method for orientation of a device axis known from DE 10 2013 217 479 A1 has the disadvantage that the temperature sensor can be attached to any position in the device housing of the rotating laser. DE 10 2013 217 479 A1 makes no statements about the type of temperature sensor and the spatial arrangement of the temperature sensor in the device housing of the rotating laser. In rotating lasers which are used outdoors, temperature differences within the rotating laser can occur due to solar radiation. In this case, the temperatures in regions of the rotating laser with direct solar radiation can differ by several degrees Celsius from temperatures in shaded areas, and the measured temperature is dependent on the spatial arrangement of the temperature sensor in the device housing of the rotating laser. The measured temperature is not taken into account when calibrating the device axes of the rotating laser and only represents a criterion when calibration of the device axes of the rotating laser is required.

The object of the present invention is to develop a method for orientation of a device axis in a defined state, in which the operating temperature of the apparatus is taken into account when orienting the device axis.

According to the invention, the method for orienting a device axis in a defined state comprises the following steps:
  Storing a curve of zero positions of a tilt sensor of a leveling unit as a function of an operating temperature of the apparatus or of an operating temperature-dependent measurand in a control device,
  Measuring the operating temperature or the measurand,
  Determining the associated zero position of the tilt sensor to the measured operating temperature or measurand based on the characteristic curve and
  Orienting the device axis in the defined state by means of the leveling unit, which is determined by the derived zero position of the characteristic curve.

The method according to the invention for orienting a device axis in a defined state has the advantage that the operating temperature of the apparatus is taken into account when orienting the device axis in the defined state and the temperature dependence of the zero position of the tilt sensor is eliminated. The operating temperature of the apparatus is the temperature which occurs during operation of the apparatus. The operating temperature is measured inside the device housing of the apparatus using a temperature sensor or the operating temperature is determined by a measurand that is dependent on the operating temperature. The defined state, in which the device axis of the apparatus is oriented by means of the leveling unit, may be a horizontal state, a vertical state or a tilted state of the device axis. The characteristic curve stored in the control device of the apparatus establishes a relationship between the operating temperature or the measurand and the temperature-dependent zero position of the tilt sensor for the device axis. As a zero position of the tilt sensor, the tilt angle is defined, which corresponds to the defined state of the device axis. From the characteristic curve, a zero position can be read for each operating temperature from the permitted operating temperature range. In the characteristic curve, a distinction can be made between temperatures at which the device axis was calibrated and temperatures at which no calibration of the device axis has yet been made.

The method according to the invention can also be carried out with a measurand that is dependent on the operating temperature. In this case, it is not the operating temperature of the apparatus which is measured, but the temperature-dependent measurand. Suitable parameters for the method according to the invention are temperature-dependent values of the apparatus, whose temperature dependence is known. The measurement of a measurand that is dependent on the operating temperature is appropriate when a measurand is used which is already measured for other purposes, so that no additional measurement effort exists, or if a measurand is used that can be measured with existing sensor elements so that there is no additional expenditure on equipment. The gas bubble of the tilt sensor has a bubble length, which is temperature-dependent and is therefore suitable as a measure of the operating temperature. The bubble length can be measured by means of the light source and the photodetector of the tilt sensor, so that no further sensor element is required for the measurement.

Preferably, the operating temperature of the apparatus is measured by means of the tilt sensor comprising a housing filled with a liquid and a gas bubble, a light source and at least one photodetector. The measurement of the operating temperature of the apparatus by means of the tilt sensor has the advantage that the operating temperature is measured exactly at the location in the device housing of the apparatus, which is relevant for the orientation of the device axis. The temperature measurement is carried out with the aid of the components of the tilt sensor, so that no further sensor element is required and the apparatus required for the temperature measurement is low.

A further characteristic curve of operating temperatures and bubble lengths of the gas bubble is particularly preferably stored in the control device, the bubble length of the gas bubble is measured by means of the light source and the photodetector of the tilt sensor and the operating temperature associated with the measured bubble length is determined on the basis of the further characteristic curve. The tilt sensor of the leveling unit comprises a housing filled with a liquid and a gas bubble, a light source and one or more photodetectors. The gas bubble of the tilt sensor has a bubble length, which is temperature-dependent and is therefore suitable as a measure of the operating temperature. The bubble length can be measured by means of the light source and the photodetector of the tilt sensor, so that no further sensor element for the temperature measurement is required.

In a further development of the method according to the invention, the accuracy with which the device axis of the apparatus is oriented in the defined state by means of the leveling unit is checked during operation of the apparatus by means of a fixed test loop, wherein a deviation from the defined state of the instrument axis is determined and compared with a maximum deviation. The device manufacturer specifies a maximum deviation for the device axis of the apparatus. As long as the deviation from the defined state of the device axis is less than the maximum deviation, the apparatus can, with proper use, be used with the accuracy specified by the device manufacturer. If the deviation from the defined state of the device axis is greater than the maximum deviation, the accuracy of the apparatus specified by the device manufacturer is not met despite proper use and the device axis must be calibrated, taking the operating temperature into account when calibrating the device axis. The test loop differs in horizontal axes and vertical axes. If the device axis is formed as a horizontal axis, a method for checking a horizontal axis is performed; if the device axis is formed as a vertical axis, a method for checking a vertical axis is performed.

If the deviation from the defined state of the device axis is greater than the maximum deviation, a new zero position of the tilt sensor for the defined state of the device axis is calculated and the characteristic curve of zero position and temperature or zero position and measurand is updated. In order to improve the accuracy of the apparatus, the operator performs a calibration of the instrument axis and determines a new zero position of the tilt sensor for the defined state of the device axis. This new zero position is used to update the characteristic curve stored in the control device.

The further method steps of the method according to the invention depend on whether the characteristic curve stored in the control device for the measured operating temperature or measurand has a stored zero position of the tilt sensor for the defined state of the device axis. The device manufacturer of the apparatus defines a temperature range for the operating temperature of the apparatus and calibrates the instrument axis at an operating temperature or at several operating temperatures. The measured zero position of the tilt sensor for the defined state of the device axis is stored together with the temperature or measurand as a value pair. The accuracy of the equipment increases with the number of different operating temperatures or measurands for which calibration of the device axis has been performed. For each temperature in the operating temperature range of the apparatus can be determined from the characteristic curve of a zero position, which is used for the orientation of the device axis in the defined state. A distinction is made between temperatures at which the device axis was calibrated and temperatures at which no calibration of the device axis has yet been performed. For the temperatures in the operating temperature range for which no calibration of the device axis has been carried out, interpolation takes place from the stored zero positions.

If the characteristic curve for the measured operating temperature or measurand has a stored zero position, the stored zero position of the tilt sensor for the defined state of the device axis in the characteristic curve is replaced by the new zero position. In this case, an old value pair in the characteristic curve is replaced by a new value pair, wherein the new value pair can also change the interpolated zero positions. The accuracy of the equipment increases with the number of different operating temperatures or metrics for which the device manufacturer has calibrated the device axis.

If the characteristic curve has no stored zero position of the tilt sensor for the measured operating temperature or measurand, a new value pair of zero position and temperature or measurand is added to the characteristic curve. With each value pair, which is supplemented in the characteristic curve, the accuracy of the apparatus grows.

In a preferred embodiment, the manufacturer stores the characteristic curve over a temperature range between a lower temperature and an upper temperature in the control device in the delivered state of the apparatus, the characteristic curve having at least two value pairs of zero positions of the tilt sensor for the defined state of the device axis and temperatures or measurands. The accuracy of the equipment increases with the number of different operating temperatures or metrics for which the device manufacturer has calibrated the device axis.

The apparatus is characterized according to invention in that in the control device, a characteristic curve is provided which represents a zero position of the tilt sensor for the defined state of the device axis that is dependent on the operating temperature of the apparatus or dependent on the operating temperature measurement. The characteristic curve establishes a relationship between the operating temperature or measurand and the temperature-dependent zero position of the tilt sensor for the device axis of the apparatus. From the characteristic curve, a zero position of the tilt sensor can be read for each temperature from the permitted operating temperature range. The accuracy with which the apparatus is operated can be increased by the use of a temperature-dependent zero position of the tilt sensor. A calibration of the device axis is only required if the orientation of the device axis has been changed by an external force or by aging of the device components.

Preferably, a further characteristic curve is provided in the control device, which represents the operating temperature of the apparatus as a function of a bubble length of the gas bubble of the tilt sensor. The tilt sensor includes a housing filled with a liquid and a gas bubble, a light source, and one or more photodetectors. The gas bubble of the tilt sensor has a bubble length, which is temperature-dependent and is therefore suitable as a measure of the operating temperature. The bubble length of the gas bubble can be measured with the aid of the light source and the photodetector, so that no further sensor element for the temperature measurement is required. In addition, the operating temperature is measured exactly at the location in the equipment housing of the apparatus that is relevant to the orientation of the device axis.

In a preferred further development, the apparatus has a first device axis, which can be oriented in a first defined state by means of a first tilt sensor and a first adjustment element, and a second device axis, which can be oriented by means of a second tilt sensor and a second adjustment element into a second defined state, and a first characteristic curve and second characteristic curve are provided in the control unit, wherein the first characteristic curve represents a first zero position of the first device axis in the first defined state as a function of the operating temperature of the apparatus or the measurand that is dependent on the operating temperature, and the second characteristic curve represents a second zero position of the second device axis in the second defined state depending on the operating temperature of the apparatus or the measurand as a function of the operating temperature. The advantage of the apparatus according to the invention is that a separate characteristic curve is stored in the control device for each device axis of the apparatus, which represents the dependence of the zero position of the tilt sensor on the operating temperature or the measurand. The apparatus has a first and a second axis of the device, which can be oriented with the aid of a first and second leveling unit in a defined state. The first leveling unit comprises a first tilt sensor and a first adjusting element and the second leveling unit comprises a second tilt sensor and a second adjusting element.

Particularly preferably, a further first characteristic curve and a further second characteristic curve are provided in the control device, the further first characteristic curve representing a first temperature of a first tilt sensor as a function of a first bubble length of a first gas bubble and the further second characteristic curve representing a second temperature of a second tilt sensor dependent on a second bubble length of a second gas bubble. The advantage is in the fact that the control unit for each device axis of the apparatus stores its own additional characteristic curve, which represents the dependence of the bubble length of a gas bubble on the temperature. The first tilt sensor has a first gas bubble and the second tilt sensor has a second gas bubble. The first gas bubble of the first tilt sensor has a first bubble length, which is temperature-dependent and is therefore suitable as a measurand for the first temperature of the first tilt sensor. The second gas bubble of the second tilt sensor has a second bubble length, which is temperature-dependent and is therefore suitable as a measurand for the second temperature of the second tilt sensor.

The first and second tilt sensors are arranged in different areas of the device housing of the apparatus and can be exposed to different temperatures. The use of the tilt sensors as temperature sensors has the advantage that the temperatures in the areas in the device housing of the apparatus are measured, which are relevant for the orientation of the device axes. The dependence of the bubble length of the gas bubble on the temperature can also differ from each other with tilt sensors of the same sensor type and/or the same series. If a separate characteristic curve is created for each tilt sensor, the accuracy with which the equipment is operated can be increased.

Embodiments of the invention are described below with reference to the drawings. This is not intended to illustrate the exemplary embodiments on the basis of a scale, but the drawings are executed schematically and/or slightly distorted. It should be understood that various modifications and changes in the form and detail of an embodiment may be made without departing from the general idea of the invention. The general idea of the invention is not limited to the exact form or detail of the preferred embodiment shown and described below, or is limited to an object which would be limited in comparison to the subject matter asserted in the claims. In the case of given design ranges, values within the limits mentioned are also to be disclosed as limiting values and can be used and claimed as desired. For the sake of simplicity, reference numerals are subsequently used below for identical or similar parts or parts with the same or similar function.

DETAILED DESCRIPTION OF THE DRAWINGS

Figure 1:
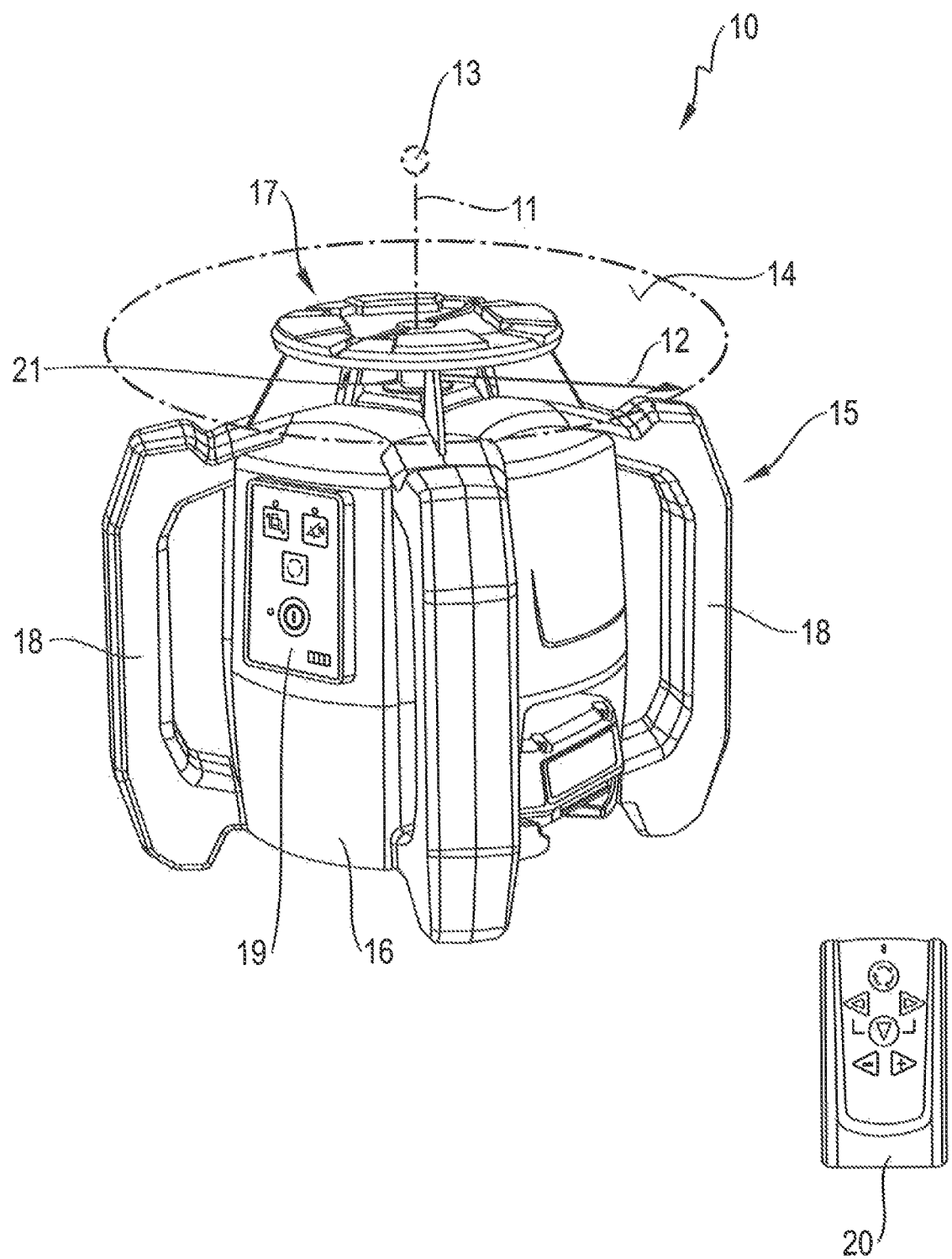
FIG. 1 illustrates an apparatus according to the invention, which can be formed as horizontally and vertically oriented rotating laser with three device axes, wherein the device axes comprise a first horizontal axis, a second horizontal axis and a vertical axis.

FIG. 1 shows an apparatus according to the invention 10, which is designed as a horizontally and vertically orientable rotating laser. The rotating laser 10 generates a first laser beam 12 rotating about an axis of rotation 11 and a second, resting laser beam 13. The rotating first laser beam 12 generates a laser plane 14, which is arranged perpendicular to the axis of rotation 11, and the second laser beam 13 runs perpendicular to the laser plane 14 of the first laser beam 12.

The rotating laser 10 comprises a device housing 15 and a measuring device arranged in the device housing 15. The device housing 15 consists of a base housing 16, a rotary head 17 and a plurality of handles 18. The operation of the rotating laser 10 via an operating device 19, which is integrated into the base housing 16 and is operable from the outside. In addition to the control device 19 integrated into the base housing 16, a remote control 20 may be provided, which is connectable via a communication link with the rotating laser 10.

The measuring device of rotating laser 10 generates in the interior of the main body 15 a laser beam which strikes an optical deflector 21 rotating about the rotation axis 11. A first part of the laser beam is deflected by the optical deflector 21 by 90° and forms the first laser beam 12 of the rotating laser 10. A second part of the laser beam passes through the optical deflector 21 and forms the second laser beam 13 of the rotating laser 10. Depending on the rotation speed at which the first laser beam 12 is rotated about the rotation axis 11, a rotation mode, a line mode, and a dot mode of the rotating laser 10 are differentiated.

Figure 2A:
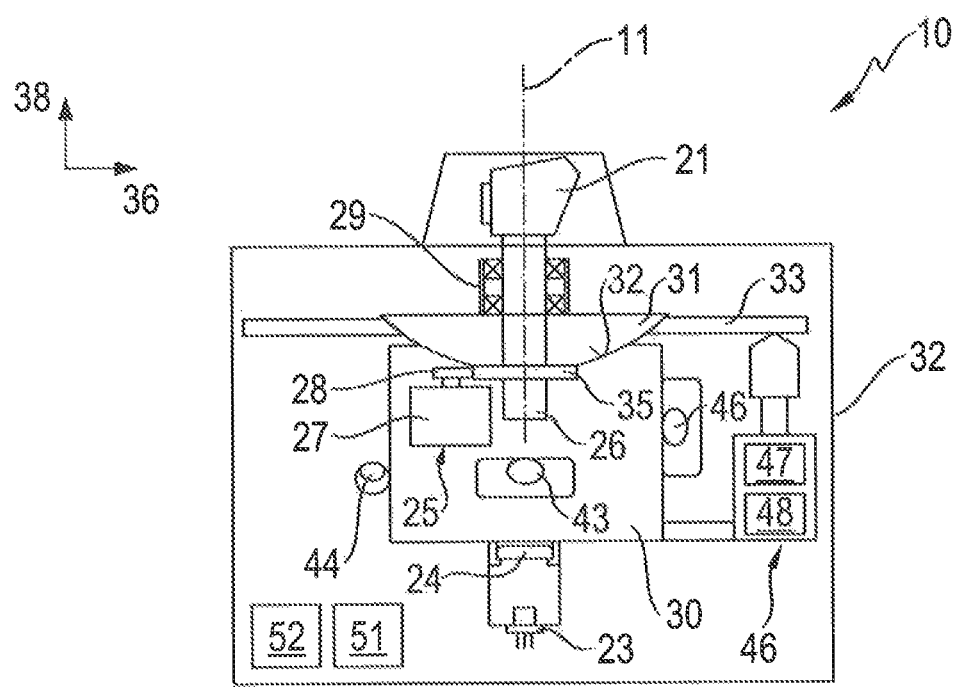
FIGS. 2A, B show the essential components of the rotating laser of FIG. 1, comprising a leveling device having a first leveling unit for orienting the first horizontal axis, a second leveling unit for orienting the second horizontal axis and a third leveling unit for orienting the vertical axis.
Figure 2B:
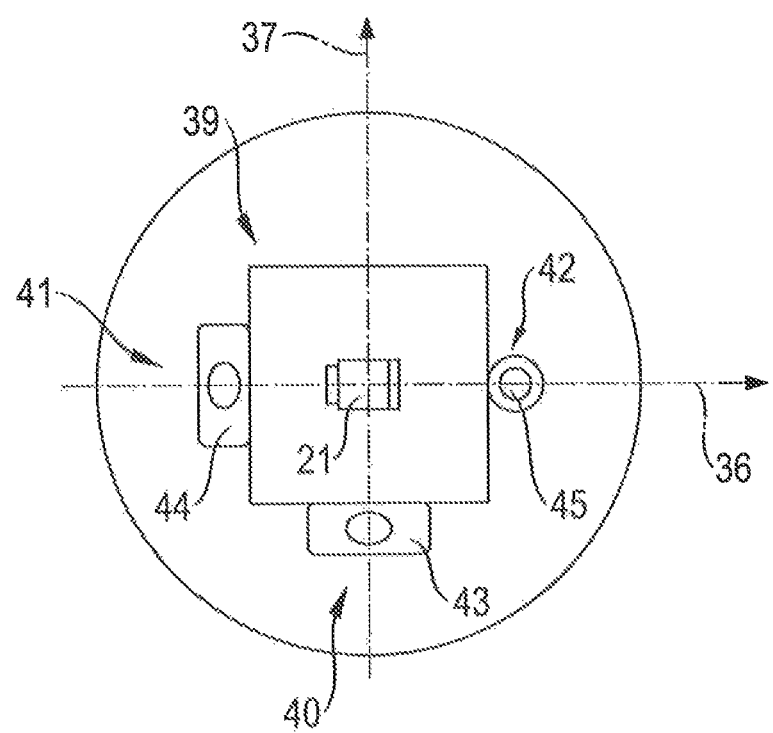

FIGS. 2A, B show the essential components of the rotating laser 10 of FIG. 1 in a schematic representation, where FIG. 2A shows the components in a vertical plane parallel to the axis of rotation 11 and FIG. 2B shows components in a horizontal plane perpendicular to the axis of rotation 11.

The rotating laser 10 comprises a laser unit with a beam source 23, which generates a laser beam, and an optical collimator 24. The beam source 23 is designed, for example, as a semiconductor laser which generates the laser beam in the visible wavelength spectrum, for example a red laser beam with a wavelength of 635 nm or a green laser beam with a wavelength of 532 nm. After the exit of the laser beam from the beam source 23, the laser beam is collimated with the aid of the optical collimator 24. Alternatively, the optical collimator can be integrated in the beam source or, in the case of a beam source 23 with a high beam quality and low divergence, the optical collimator can be dispensed with.

The collimated laser beam impinges on the optical deflector 21, which separates the first and second laser beams 12, 13. The optical deflector 21 is connected to a rotating device 25, which moves the deflector 21 about the axis of rotation 11. The rotating device 25 comprises a rotatable shaft 26, a motor unit 27 and a transmission device 28, which is for example in the form of a toothed belt and transmits the movement of the motor unit 27 to the shaft 26. The deflector 21 is coupled to the rotatable shaft 26 and rotatably formed about the rotation axis 11. The shaft 26 is mounted in a rotary bearing 29 of a stator 30, which is connected to a spherical cap 31. The spherical cap 31 is tiltably positioned in a spherical cap bearing 32 in a housing-mounted mounting frame 33 in two swivel planes vertical to the plane of rotation (plane perpendicular to the axis of rotation 11). The rotating laser 10 comprises a measuring device 35, which measures the angle of rotation of the shaft 26 during rotation about the axis of rotation 11. The measuring device 35 is designed, for example, as an angle encoder and consists of a measuring disk, which is rotatably connected to the shaft 26, a scanning device with which the gauge wheel is scanned, and an evaluation and control element.

The rotating laser 10 is designed as a horizontally and vertically usable rotating laser, wherein a horizontally and vertically usable rotating laser differ by an additional device axis of a horizontally usable rotating laser. The rotating laser 10 has as device axes a first horizontal axis 36 and a second horizontal axis 37, which run perpendicular to one another and span a device plane. The first and second horizontal axes 36, 37 are displayed on the rotary head 17 of the rotating laser 10 via display elements. The horizontally and vertically usable rotating laser 10 has, in addition to the first and second horizontal axis 36, 37, a further device axis, which is referred to as a vertical axis 38 and is oriented in the ideal case perpendicular to the device plane of the first and second horizontal axis 36, 37.

The rotating laser 10 is formed as a self-leveling rotating laser, which automatically levels itself when the device housing 15 of the rotating laser 10 is placed within a self-levelling zone. The self-leveling range of rotating lasers is typically 5°. The rotating laser 10 comprises a self-leveling device 39, which orients the device axes of the rotating laser 10 independently of an orientation of the device housing 15 in a defined state. The leveling device 39 comprises a first leveling 40, which orients the first horizontal axis 36 in a first defined state, a second leveling unit 41, which orients the second horizontal axis 37 in a second defined state, and a third leveling unit 42, which orients the vertical axis 38 in a third defined state.

The first leveling unit 40 includes a first tilt sensor 43 and a first adjusting element, the second leveling unit 41 includes a second tilt sensor 44 and a second adjusting element, and the third leveling unit 42 includes a third tilt sensor 45 and a third adjusting element. The adjusting elements of the leveling units 40, 41, 42 are integrated in a tilting device 46, which has a first adjusting motor 47 and a second adjusting motor 48. The first variable adjustment motor 47 tilts inclines the mounting frame 33 about a first pivotal axis coincident with the second horizontal axis 37, and the second variable adjustment motor 48 tilts the the first adjusting element of the first leveling unit 40 and the second adjusting motor 48 forms the mounting frame 33 about a second pivotal axis coincident with the first horizontal axis 36. The first adjusting motor 47 forms second adjusting element of the second leveling unit 41. Since the vertical axis 38 is oriented perpendicular to the horizontal plane of the first and second horizontal axis 36, 37, the orientation of the vertical axis 38 by means of the first and second adjusting motors 47, 48 can be adjusted. The first and second adjusting motors 47, 48 together form the third adjusting element of the third leveling unit 42.

The horizontal orientation of the laser plane or the device level represents a preferred defined state in which a rotating laser 10 is to be oriented in horizontal position, wherein the horizontally oriented device level is also referred to as a horizontal plane. The vertical orientation of the laser plane or the device level represents a preferred defined state in which a rotating laser 10 is to be oriented in a vertical position, wherein the vertically oriented device level is also referred to as a vertical plane. The laser plane generated by the rotating first laser beam 12 can be inclined by means of the tilting device 46 with respect to the horizontal plane or the vertical plane of the rotating laser 10. The rotating laser 10 may tilt the laser plane of the rotating first laser beam 12 in a tilt direction or in two tilt directions. The tilting of the laser plane is performed in the leveled state of rotation laser 10. The rotating laser 10 can be tilted in a horizontal position or in a vertical position.

The control and evaluation of the rotating laser 10 takes place via control elements, which are connected to the radiation source 23, the rotating device 25, the measuring device 35, the leveling device 40, 41, 42 and the tilt device 46. The control elements are integrated in a common control device 51, which is designed for example as a microcontroller, or can be designed as separate components. The rotating laser 10 additionally comprises a temperature sensor 52, which is arranged in the device housing 15 of the rotating laser 10. The temperature sensor 52 measures the temperature in the device housing 15 and transmits the temperature to the control device 51. Since the orientation of the tilt sensors 43, 44, 45, which orient the device axes 36, 37, 38 of the rotating laser 10 in the defined state, is temperature-dependent, and the rotating laser 11 can be used over a wide temperature range, for example between −20° C. and +50° C., it is advantageous if a plurality of zero positions $U$ are stored in the control device 51 of the rotating laser 10. For this purpose, a plurality of first zero positions $U_1$ for the first tilt sensor 43, a plurality of second zero positions $U_2$ for the second tilt sensor 44 and a plurality of third zero positions $U_3$ for the third tilt sensor 45 can be recorded as a function of the temperature and stored in a characteristic curve or table. The zero position associated with the measured temperature is read from the characteristic curve or table and the device axis is oriented in the state defined by the zero position.

Figure 3:
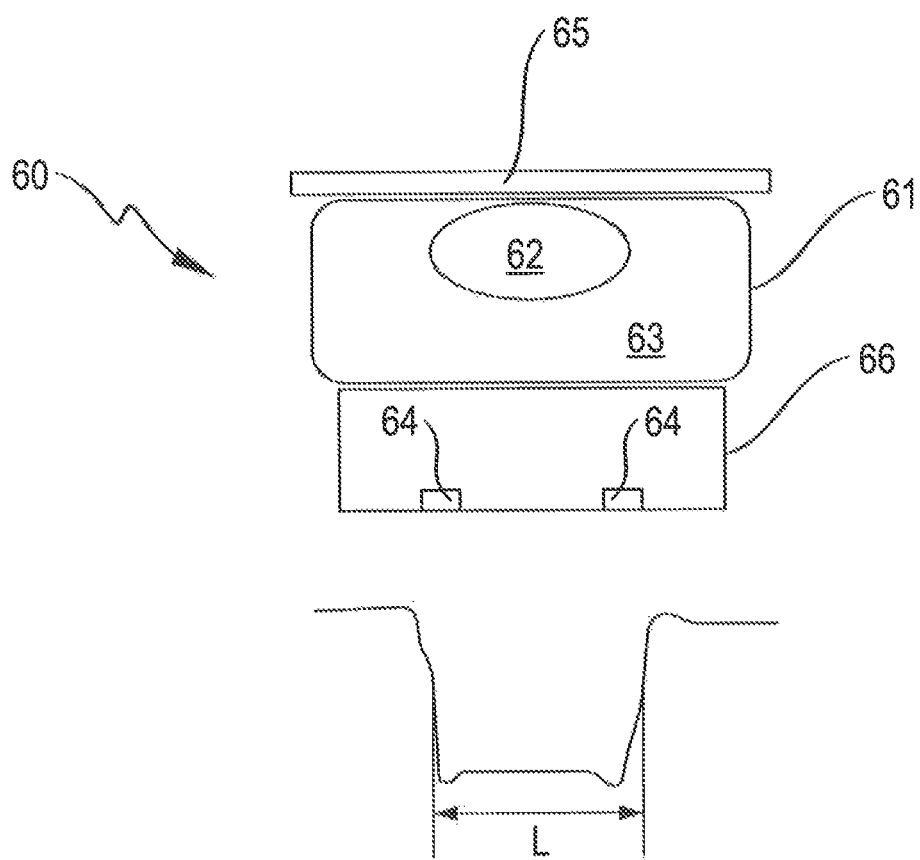
FIG. 3 shows the structure of a tilt sensor for the leveling units of the rotating lasers with a housing filled with a liquid and a gas bubble, a light source and a photodetector.

FIG. 3 shows the construction of an optical tilt sensor 60, which corresponds in structure to the tilt sensors 43, 44, 45 for the leveling units 40, 41, 42 of the rotating laser 10. The tilt sensor 60 comprises a housing 61, which is filled with a gas bubble 62 and a liquid 63, a light source 64, a photodetector 65 and a spacer 66.

The rotating laser 10 has three device axes, which are formed as first horizontal axis 36, second horizontal axis 37 and vertical axis 38. The leveling device 39 of the rotating laser 10 comprises, for each device axis 37, 38, 39, a leveling unit 40, 41, 42 with a tilt sensor 43, 44, 45 and an adjusting element. The tilt sensors 43, 44, 45 operate independently of one another and can have different temperatures during operation of the rotating laser 10.

The temperature of the rotating laser 10 can be measured by means of the temperature sensor 52, which is arranged in the device housing 15 of the rotating laser 10. In order to increase the accuracy of the temperature measurement, a plurality of temperature sensors 52 can be arranged in the device housing 15 and an average temperature can be determined. Alternatively, the temperatures of the tilt sensors 43, 44, 45 may be measured. The temperature of the first tilt sensor 43 is referred to as the first temperature $T_1$, the temperature of the second tilt sensor 44 as the second temperature $T_2$ and the temperature of the third tilt sensor 45 as a third temperature $T_3$.

The gas bubble 62 of the tilt sensor 60 has a bubble length L, which is temperature-dependent and therefore suitable as a measure of the temperature T of the tilt sensor 60. The bubble length L of the gas bubble 62 can be measured by means of the light source 64 and the photodetector 65. To distinguish the first, second and third tilt sensors 43, 44, 45, the components of the tilt sensors 43, 44, 45 are provided with an index, which is separated by a hyphen from the reference character. The first tilt sensor 43 has the index "1," the second tilt sensor 44 has the index "2" and the third tilt sensor 45 has the index "3." The first temperature $T_1$ of the first tilt sensor 43 is determined by a first bubble length L1 of the first gas bubble 62-1, the second temperature $T_2$ of the second tilt sensor 44 is determined by a second bubble length L2 of the second gas bubble 62-2 and the third temperature $T_3$ of the third tilt sensor 45 is determined by a third bubble length $L_3$ of the third gas bubble 62-3.

The temperature is measured by the tilt sensors 43, 44, 45, has the advantage versus a temperature measurement by the temperature sensor 52 that the temperature $T_1$, T2, $T_3$ is measured exactly at the location in the device housing 15 of the rotating laser 10, which is relevant for the orientation of the first horizontal axis 36, the second horizontal axis 37 and the vertical axis 38. The first tilt sensor 43 measures the first temperature $T_1$ and the first tilt angle of the first horizontal axis 36, the second tilt sensor 44 measures the second temperature $T_2$ and the second tilt angle of the second horizontal axis 37, and the third tilt sensor 47 measures the third temperature $T_3$ and the third tilt angle of the vertical axis 38.

Figure 4:
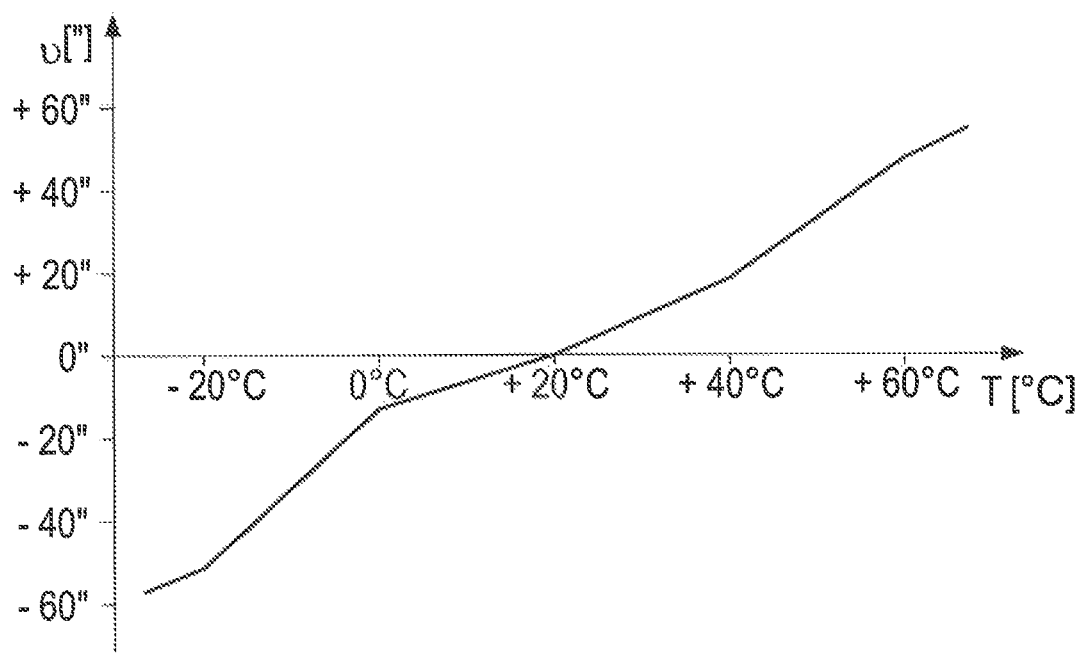
FIG. 4 is a characteristic curve of zero positions of the tilt sensor of FIG. 3 that is dependent on a temperature.

FIG. 4 shows a characteristic curve representing the zero position U of the tilt sensor 60 depending on the temperature T. The characteristic curve establishes a relationship between the temperature T of the tilt sensor 60 and the zero position U of the tilt sensor 60, which corresponds to the orientation in the defined state of the tilt sensor 60, for the permitted temperature range of the rotating laser 10 from −20° C. to +50° C.

In order to orient the rotating laser 10 in a defined state, the temperature T of the rotating laser 10 is measured by means of the temperature sensor 52 and transmitted to the control device 51. Based on the characteristic curve, the associated zero positions $U_1$, $U_2$, $U_3$ of the tilt sensors 43, 44, 45 are determined and the device axes 36, 37, 38 oriented by means of leveling units 40, 41, 42 in the defined state. The accuracy in orienting the tool axes 36, 37, 38 of the rotating laser 10 can be increased when measuring the temperatures $T_1$, $T_2$, $T_3$ of the tilt sensors 43, 44, 45 and/or for each tilt sensor 43, 44, 45 of the leveling device 39, its own characteristic curve, which represents the zero position U depending on the temperature T, is determined.

The temperatures T, $T_2$, $T_3$ of the tilt sensors 43, 44, 45 can be measured by the tilt sensors 43, 44, 45 themselves. The gas bubble of a tilt sensor has a bubble length L, which is temperature-dependent and therefore suitable as a measure of the temperature, wherein the bubble length L can be measured by means of the light source 64 and the photo detector 65 of the tilt sensor. The control device 51 of the rotating laser 10 has a first characteristic curve which represents the first zero position U 1 of the first tilt sensor 43 as a function of the first temperature $T_1$, a second characteristic curve, the second zero position $U_2$ of the second tilt sensor 44 as a function of the second temperature $T_2$, and a third characteristic curve, the third zero position $U_3$ of the third tilt sensor 45 as a function of the third temperature $T_3$.

In order to be able to measure the temperature of the tilt sensors without an additional temperature sensor, the relationship between the bias length L of the gas bubble 62 and the temperature of the tilt sensor must be known. For this purpose, a further characteristic curve is stored in the control device 51 of the rotating laser 10, which establishes a relationship between the temperature T and the bubble length L of the gas bubble 62 for the device axis.

Figure 5:
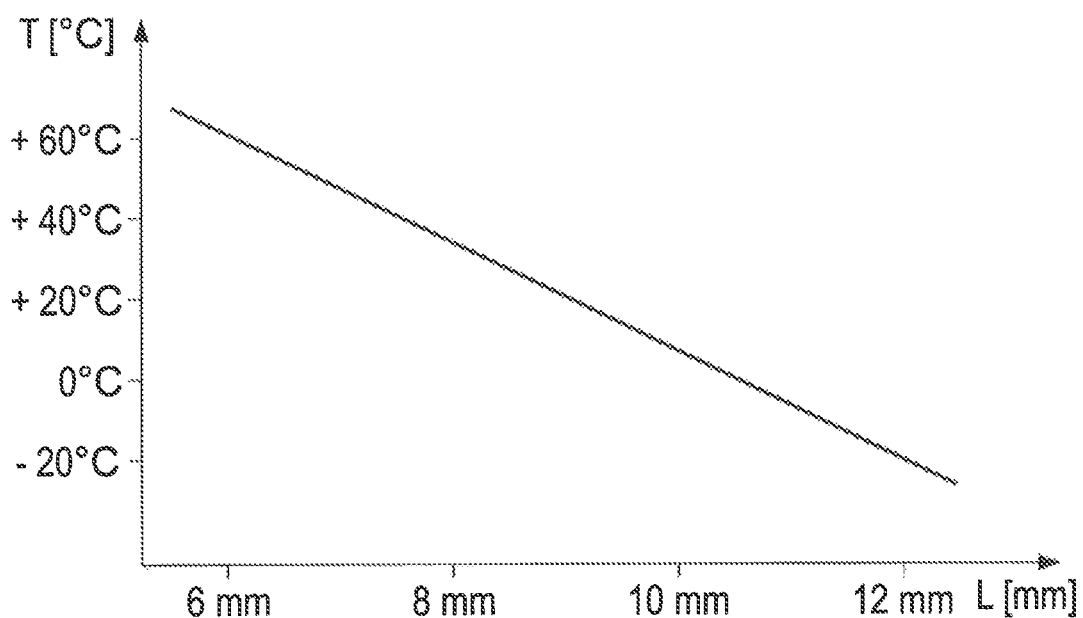
FIG. 5 shows a characteristic curve of temperatures of the tilt sensor of FIG. 3 that is dependent on the bubble length of the gas bubble.

FIG. 5 shows the other characteristic curve which represents the temperature T of the tilt sensor 60 depending on the bubble length L of the gas bubble 62. The further characteristic curve establishes a relationship between the temperature T of the tilt sensor 60 and the bubble length L of the gas bubble 62 for the permitted temperature range of the rotary slide 10 from −20° C. to +50° C. The bubble length L of the gas bubble 62 changes linearly with the temperature T of the tilt sensor 60, and the bubble length L decreases as the temperature T decreases.

The accuracy when orienting the device axes 36, 37, 38 of the rotating laser 10 can be increased if, for each tilt sensor 43, 44, 45 of the leveling device 39, a separate further characteristic curve, which represents the temperature of the tilt sensor as a function depending on the bubble length of the gas bubble, is determined. The control device 51 of the rotating laser 10 has a further first characteristic curve, which represents the first temperature T of the first tilt sensor 43 depending on the first bubble length $L_1$ of the first gas bubble 62-1, a further second characteristic curve, the second temperature $T_2$ of the second tilt sensor 44 as a function of the second bubble length $L_2$ of the second gas bubble 62-2, and another third characteristic curve representing the third temperature $T_3$ of the third tilt sensor 45 depending on the third bubble length $L_3$ of the third gas bubble 62-3.

FIG. 4 shows a characteristic curve in which the zero position U of the tilt sensor 60 is shown as a function of the temperature T. The method according to the invention can also be carried out with a measurand that is dependent on the temperature T. In this case, it is not the temperature of the apparatus that is measured, but the temperature-dependent measurand. Suitable measurands are temperature-dependent values of the apparatus, whose temperature-dependence is known. The measurement of a temperature-dependent measurand is appropriate when a measurand is used which is already measured for other purposes, so that no additional measurement effort exists, or if a measurand is used that can be measured with existing sensor elements so that there is no additional expenditure on equipment. The gas bubble of the tilt sensor has a bubble length, which is temperature-dependent and is therefore suitable as a measurand for the temperature of the tilt sensor. The bubble length can be measured by means of the light source and the photodetector of the tilt sensor, so that no further sensor element is required for the measurement.

If the method according to the invention is carried out with the temperature-dependent bubble length of the gas bubble as the measurand, the characteristic curve of FIG. 4, which represents the zero position U of the tilt sensor 60 as a function of the temperature T, replaced by a characteristic curve which represents the zero position U of the tilt sensor 60 as a function of the bubble length L of the gas bubble 62. The control device 51 of the rotating laser 10 has a first characteristic curve, which represents the first zero position U 1 of the first tilt sensor 43 as a function of the first bubble length $L_1$, the first gas bubble 62-1, a second characteristic curve, the second zero position $U_2$ of the second tilt sensor 44 as a function of the second bubble length L2 of the second gas bubble 62-2, and a third characteristic curve, the third zero position $U_3$ of the third tilt sensor 45 as a function of the third bubble length $L_3$ of the third gas bubble 62-3.

The invention claimed is:

1. A method for orienting a device axis (36, 37, 38) of an apparatus (10) by a leveling unit (40, 41, 42) into a defined state, comprising the steps of:
   storing a characteristic curve of zero positions ( U ) of a tilt sensor (60) of the leveling unit (40, 41, 42) as a function of an operating temperature (T) of the apparatus (10) or an operating-temperature-dependent measurand (L) (T) in a control device (51);
   measuring the operating temperature (T) or the measurand (L);

determining an associated zero position (U) of the tilt sensor (60) to the measured operating temperature (T) or measurand (L) based on the characteristic curve; and orienting the device axis (36, 37, 38) in the defined state by the leveling unit (40, 41, 42) based on the determined associated zero position (U).

2. The method according to claim 1, wherein the operating temperature (T) of the apparatus (10) is measured by the tilt sensor (60) and wherein the tilt sensor (60) has a housing (61) which is filled with a gas bubble (62) and a liquid (63), a light source (64), and a photodetector (65).

3. The method according to claim 2, wherein a further characteristic curve of operating temperatures (T) and bubble lengths (L) of the gas bubble (62) is stored in the control device (51), wherein a bubble length (L) of the gas bubble (62) is measured by the light source (64) and the photodetector (65) of the tilt sensor (60), and wherein an operating temperature (T) associated with the measured bubble length (L) is determined on a basis of the further characteristic curve.

4. The method according to claim 1, wherein an accuracy with which the device axis (36, 37, 38) of the apparatus (10) is oriented in the defined state by the leveling unit (40, 41, 42) is checked during operation of the apparatus (10) by a predetermined test loop wherein a deviation from the defined state of the device axis (36, 37, 38) is determined and compared with a maximum deviation.

5. The method according to claim 4, wherein a new zero position of the tilt sensor (60) for the defined state of the device axis (36, 37, 38) is calculated and the characteristic curve of the zero position and operating temperature (T) or the characteristic curve of the zero position and measurand (L) is updated when a deviation from the defined state of the device axis (36, 37, 38) is greater than the maximum deviation.

6. The method according to claim 5, wherein in the characteristic curve a stored zero position (U) of the tilt sensor (60) for the defined state of the device axis (36, 37, 38) is replaced by the new zero position (U) if the characteristic curve for the measured operating temperature (T) or the measurand (L) has a stored zero position (U).

7. The method according to claim 5, wherein in the characteristic curve a new value pair for the zero position (U) of the tilt sensor (60) and temperature (T) or measurand (L) is supplemented when the characteristic curve for the measured operating temperature (T) or the measurand (IL) has no stored zero position (U) of the tilt sensor (60).

8. The method according to claim 1, wherein in a delivered condition of the apparatus (10) from a manufacturer, the characteristic curve of the zero position (U) and the temperature (T) or the measurand (L) over a temperature range (ΔT) between a lower temperature (Tmin) and an upper temperature (Tmax) is stored in the control device (51), wherein the characteristic curve has at least two value pairs of zero positions (U) for the defined state of the device axis (36, 37, 38) and operating temperatures (T) or measurands (L).

9. An apparatus (10) with a device axis (36, 37, 38) orientable to a defined state, comprising:
a control device (51);
a tilt sensor (43, 44, 45; 60) having a housing (61) filled with a gas bubble (62) and a liquid (63), a light source (64), and a photodetector (65), wherein the tilt sensor (43, 44, 45; 60) is connected to the device axis (36, 37, 38) and measures an orientation of the device axis (36, 37, 38) to the defined state; and
an adjustment element (46, 47) which is connected to the device axis (36, 37, 38) and which adjusts the orientation of the device axis (36, 37, 38);
wherein a characteristic curve is provided in the control device (51) which represents a zero position (U) of the tilt sensor (43, 44, 45; 60) as a function of an operating temperature (T) of the apparatus (10) or a measurand (L) dependent on the operating temperature (T).

10. The apparatus, according to claim 9, wherein a further characteristic curve is provided in the control device (51) which represents the operating temperature (T) of the apparatus (10) as a function of a bubble length (L) of the gas bubble (62) of the tilt sensor (60).

11. The apparatus according to claim 9, wherein the apparatus (10) has a first device axis (36) which is orientable in a first defined state by a first tilt sensor (43) and a first adjusting element (46), and a second device axis (37) which is orientable in a second defined state by a second tilt sensor (44) and a second adjusting element (47), wherein a first characteristic curve and a second characteristic curve are provided in the control device (51), wherein the first characteristic curve represents a first zero position (U1) of the first device axis (36) in the first defined state as a function of the operating temperature (T) or the measurand (L) and the second characteristic curve represents a second zero position (02) of the second device axis (37) in the second defined state as a function of the operating temperature (T) or the measurand (L).

12. The apparatus according to claim 11, wherein a further first characteristic curve and a further second characteristic curve are provided in the control device (51), wherein the further first characteristic curve represents a first temperature (T1) of the first tilt sensor (43) as a function of a first bubble length (L1) of a first gas bubble (62-1) of the first tilt sensor (43) and the further second characteristic curve represents a second temperature (T2) of the second tilt sensor (44) as a function of a second bubble length (L2) of a second gas bubble (62-2) of the second tilt sensor (44).

* * * * *